US012305524B1

(12) United States Patent
Tomes

(10) Patent No.: US 12,305,524 B1
(45) Date of Patent: May 20, 2025

(54) CONTAINMENT RING FOR GAS TURBINE ENGINE

(71) Applicant: Pratt & Whitney Canada Corp., Longueuil, Québec (CA)

(72) Inventor: Nathan Tomes, Hamilton (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/652,701

(22) Filed: May 1, 2024

(51) Int. Cl.
*F01D 25/24* (2006.01)

(52) U.S. Cl.
CPC .......... *F01D 25/24* (2013.01); *F05D 2220/36* (2013.01); *F05D 2300/6033* (2013.01)

(58) Field of Classification Search
CPC ........................... F01D 25/24; F05D 2300/603
See application file for complete search history.

(56) References Cited

U.S. PATENT DOCUMENTS

| | | | | |
|---|---|---|---|---|
| 4,902,201 | A * | 2/1990 | Neubert | F01D 21/045 181/204 |
| 5,447,411 | A | 9/1995 | Curley et al. | |
| 8,333,558 | B2 | 12/2012 | Finn et al. | |
| 8,425,178 | B2 * | 4/2013 | Lenk | F04D 29/526 415/173.1 |
| 8,827,629 | B2 | 9/2014 | Voleti et al. | |
| 10,711,635 | B2 * | 7/2020 | Worthoff | B32B 5/263 |
| 11,149,584 | B2 * | 10/2021 | Crall | F01D 21/045 |
| 11,499,448 | B2 * | 11/2022 | Yadav | F02K 3/06 |
| 2005/0271503 | A1 * | 12/2005 | Harper | F01D 21/045 415/170.1 |
| 2010/0077721 | A1 * | 4/2010 | Marshall | F01D 21/045 415/200 |
| 2010/0111675 | A1 * | 5/2010 | Wojtyczka | F04D 29/664 415/200 |
| 2016/0333738 | A1 * | 11/2016 | Ivakitch | F01D 21/045 |
| 2018/0347585 | A1 * | 12/2018 | Unton | F04D 29/526 |
| 2020/0040909 | A1 * | 2/2020 | Jain | F01D 25/26 |

* cited by examiner

*Primary Examiner* — Eldon T Brockman
(74) *Attorney, Agent, or Firm* — CANTOR COLBURN LLP

(57) ABSTRACT

A casing for a gas turbine engine, including: an inner ring portion that provides a gaspath and structural features of the casing; an outer ring portion; and an inner ceramic layer arranged radially between the inner ring portion and the outer ring portion, wherein the inner ceramic layer is bonded directly to an inner surface of the outer ring portion such that the combination of the outer ring portion and the inner ceramic layer provide both containment and primary structural features of the casing.

20 Claims, 4 Drawing Sheets

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: an inner ring portion that provides a gaspath and structural features of the casing; an outer ring portion; and an inner ceramic layer arranged radially between the inner ring portion and the outer ring portion, wherein the inner ceramic layer is bonded directly to an inner surface of the outer ring portion such that the combination of the outer ring portion and the inner ceramic layer provide both containment and primary structural features of the casing.

In addition to one or more of the features described above, or as an alternative to any of the foregoing embodiments, the inner ceramic layer is formed from ceramic such as silicon carbide or boron carbide or a ceramic matrix composite.

In addition to one or more of the features described above, or as an alternative to any of the foregoing embodiments, the outer ring portion is a ductile metal structure.

In addition to one or more of the features described above, or as an alternative to any of the foregoing embodiments, a layer of honeycomb is located between the inner ring portion and the inner ceramic layer.

In addition to one or more of the features described above, or as an alternative to any of the foregoing embodiments, the inner ceramic layer is a single piece that circumferentially surrounds an inner surface of the outer ring portion.

In addition to one or more of the features described above, or as an alternative to any of the foregoing embodiments, the inner ceramic layer is curved to match a curvature of the inner surface of the outer ring portion.

In addition to one or more of the features described above, or as an alternative to any of the foregoing embodiments, the inner ceramic layer comprises a plurality of ceramic inner segments that circumscribe the inner surface of the outer ring portion.

In addition to one or more of the features described above, or as an alternative to any of the foregoing embodiments, each of the plurality of ceramic inner segments are curved to match a curvature of the inner surface of the outer ring portion.

In addition to one or more of the features described above, or as an alternative to any of the foregoing embodiments, each of the plurality of ceramic inner segments have a fore and aft end and the aft end of each of the plurality of ceramic inner segments abuts a fore end of an adjacent one of the plurality of ceramic inner segments such that a plurality of joints are provided between each of the plurality of ceramic inner segments.

In addition to one or more of the features described above, or as an alternative to any of the foregoing embodiments, an expansion joint is located between each of the plurality of ceramic inner segments.

In addition to one or more of the features described above, or as an alternative to any of the foregoing embodiments, each of the plurality of ceramic inner segments have a fore and aft end and the aft end of each of the plurality of ceramic inner segments overlaps a fore end of an adjacent one of the plurality of ceramic inner segments such that a plurality of overlapping joints are provided between each of the plurality of ceramic inner segments.

In addition to one or more of the features described above, or as an alternative to any of the foregoing embodiments, the fore and aft end of each of the plurality of ceramic inner segments have a flange configured to mate with a corresponding flange of an adjacent one of the plurality of ceramic inner segments.

In addition to one or more of the features described above, or as an alternative to any of the foregoing embodiments, the inner ring portion is formed from a ductile metal and the inner ring portion is formed with a recessed area and an abradable surface is located within the recessed area.

In addition to one or more of the features described above, or as an alternative to any of the foregoing embodiments, a layer of honeycomb or foam is located between the inner ring portion and the inner ceramic layer and the layer of honeycomb or foam is bonded to both the inner ceramic layer and the inner ring portion.

In addition to one or more of the features described above, or as an alternative to any of the foregoing embodiments, the casing is a fan casing.

Also disclosed is a gas turbine engine, including: a fan having a plurality of fan blades; a casing surrounding the plurality of fan blades, the casing including: an inner ring portion that provides a gaspath and structural features of the casing; an outer ring portion; and an inner ceramic layer arranged radially between the inner ring portion and the outer ring portion, wherein the inner ceramic layer is bonded directly to an inner surface of the outer ring portion such that the combination of the outer ring portion and the inner ceramic layer provide both containment and primary structural features of the casing.

In addition to one or more of the features described above, or as an alternative to any of the foregoing embodiments, the inner ring portion is formed with a recessed area and an abradable surface is located within the recessed area and the abradable surface is aligned with plurality of fan blades.

In addition to one or more of the features described above, or as an alternative to any of the foregoing embodiments, the outer ring portion is a ductile metal structure or composite material and a layer of honeycomb is located between the inner ring portion and the inner ceramic layer.

In addition to one or more of the features described above, or as an alternative to any of the foregoing embodiments, the inner ceramic layer is a single piece that circumferentially surrounds an inner surface of the outer ring portion.

In addition to one or more of the features described above, or as an alternative to any of the foregoing embodiments, the inner ceramic layer comprises a plurality of ceramic inner segments that circumscribe the inner surface of the outer ring portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
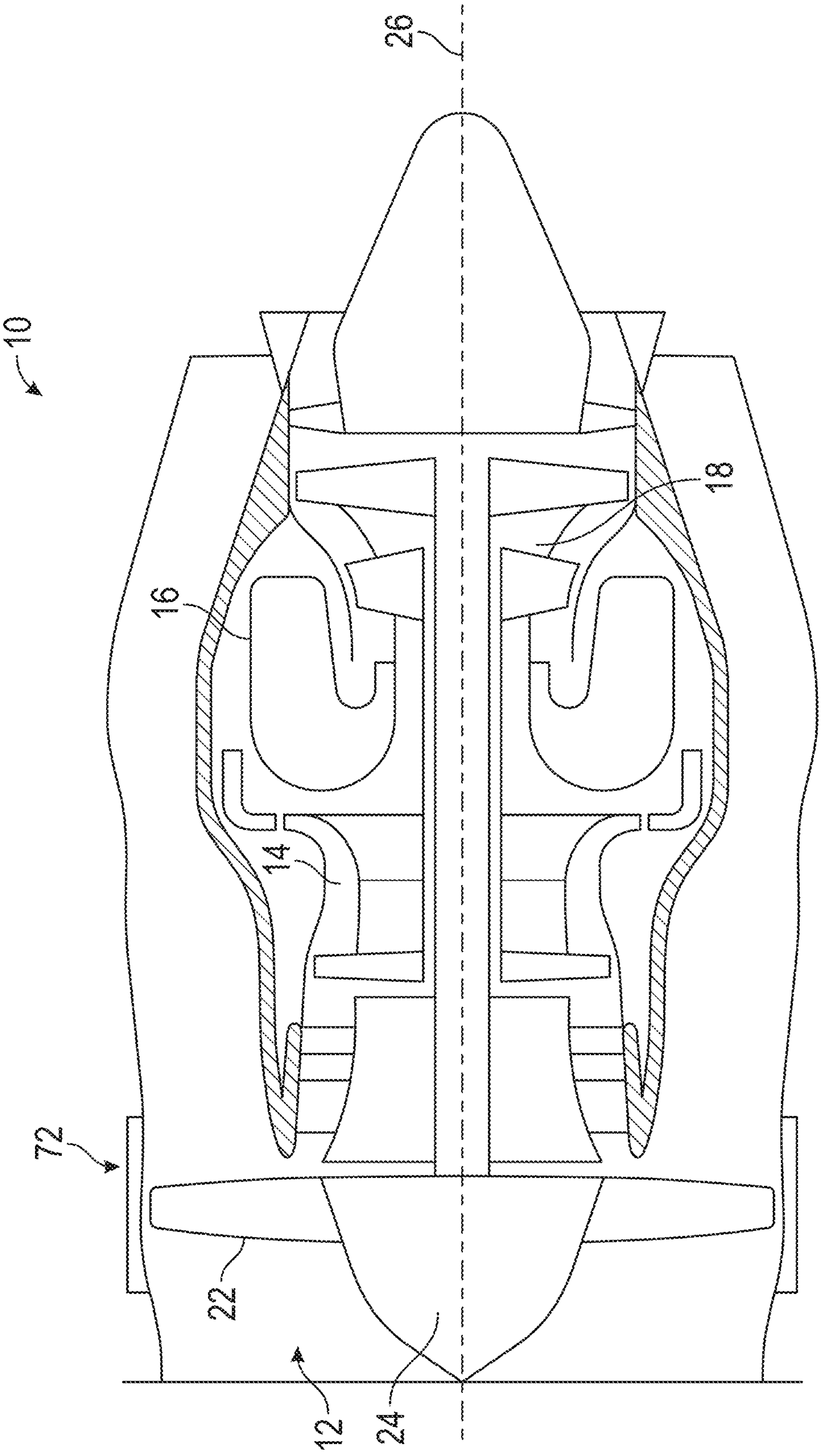
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms “radial”, “axial” and “circumferential” used throughout the description and the appended claims, are defined with respect to the central axis 26 of the engine 10. The terms “front”, “forward” “afore”, “aft” and after” used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, “integral” or “integrally formed” is intended to cover a single unitary structure. In other words, the single unitary structure is not capable of being disassembled without cutting or destruction of the single unitary structure.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade’s kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

In some instances, it has been observed that when a released blade folds, a sharp point at the leading edge of the blade can form where the effective geometric stiffness is significantly increased from that of a flat blade or blade tip, and the local plastic deformation causes strain hardening. In some cases this stiff hard corner acts as a cutter, effectively machining or cutting through the containment layers of either hardwall or soft wall containment structure.

Figure 2:
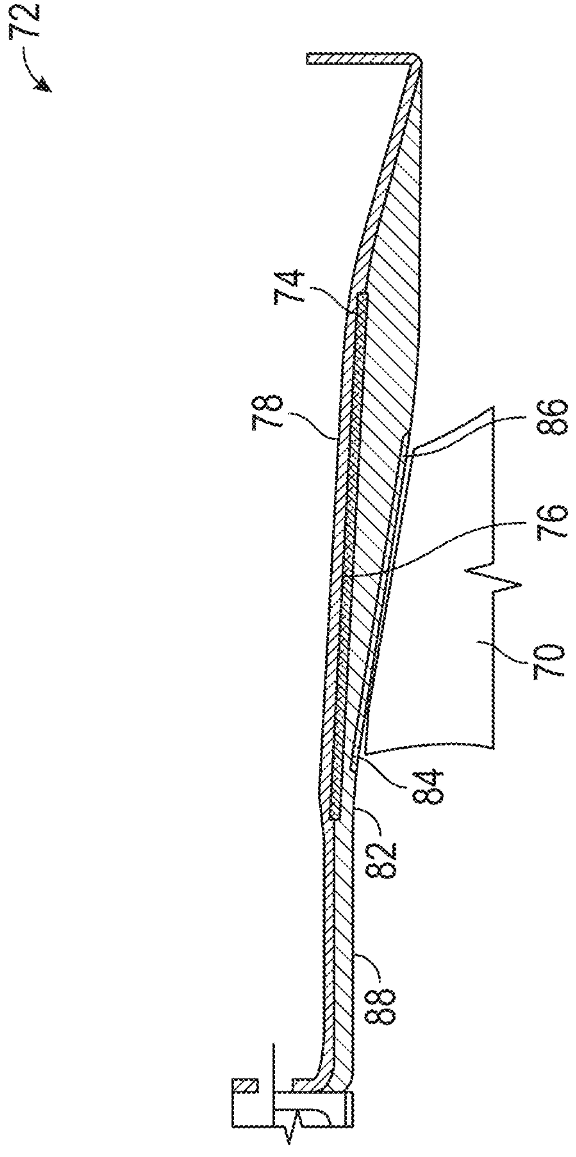
FIG. 2 is a partial perspective cross-sectional views of a fan case in accordance with the present disclosure.

FIG. 2 illustrates a portion of a casing 72 in accordance with the present disclosure. In one embodiment, the casing 72 is a fan casing 72 intended to retain fan blades 22 of the fan 12. It should be understood that while the casing 72 is illustrated as a fan casing the design of the casing 72 can be applied to other containment stages of the gas turbine engine (e.g., compressor section and turbine section).

In order to prevent the aforementioned cutting of the containment layer(s) of the casing 72 a ceramic inner layer 74 is bonded to an inner surface 76 of an outer layer or outer ring layer or outer ring portion 78 of the casing 72. In one embodiment, the combination of the outer ring portion 78 and the ceramic inner layer 74 provide both containment and primary structural features of the casing 72. In one embodiment, the ceramic inner layer 74 is directly bonded to the inner surface 76 of the outer layer or outer ring layer or outer ring portion 78. In one non-limiting embodiment, the ceramic inner layer 74 is directly bonded to the inner surface 76 of the outer layer or outer ring layer or outer ring portion 78 by an epoxy or polyurethane or equivalents thereof. In one embodiment, the outer layer or outer ring layer or outer ring portion 78 is a hard wall containment case, which may be formed from a ductile material such as metal or alternatively, the outer layer or outer ring layer 78 may be formed from a composite material, the composite material being anyone of glass, carbon, or aramid fiber reinforced epoxy or equivalents thereof.

In one embodiment, the ceramic inner layer 74 is a hard ceramic material such as silicon carbide or boron carbide. Alternatively, the ceramic layer 74 is a ceramic matrix composite. The ceramic inner layer 74 is bonded to the inner surface 76 of the outer layer or outer ring layer 78. In one non-limiting embodiment, the ceramic inner layer 74 is bonded to the inner surface 76 of the outer layer or outer ring layer 78 by an epoxy or polyurethane or equivalents thereof. In one non-limiting embodiment, the outer layer or outer ring layer 78 is a ductile metal structure and the ceramic inner layer 74 is positioned such that it is impacted directly by a released blade, and the ductile material of the outer ring layer is faced radially outward such that it is not directly impacted by a released blade but acts to keep fragments of the inner ceramic layer 74 together after fracture of the ceramic inner layer 74 occurs.

Figure 3:
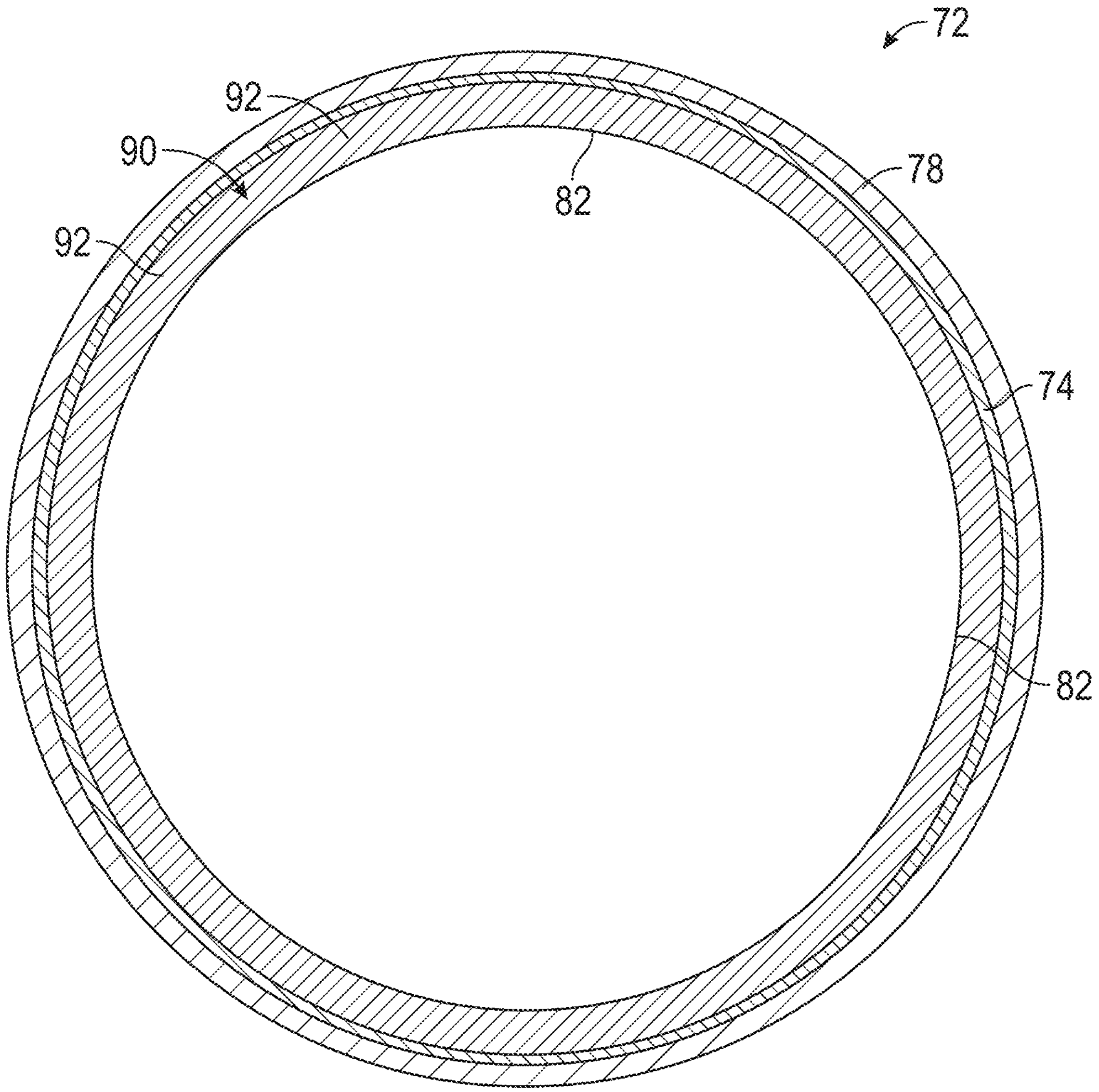
FIG. 3 is an end view of a fan case in accordance with an embodiment of the present disclosure.

Since the inner ceramic layer 74 and the outer ring layer are formed from different materials they will have different coefficients of thermal expansion. If the difference in coefficients of thermal expansion between the inner ceramic layer 74 and the outer layer or outer ring layer 78 is minimal, a single piece ceramic layer may be used. In this embodiment, the single piece ceramic layer will circumscribe the entire inner surface 76 of the outer layer or outer ring layer 78. See for example, FIG. 3, which is a schematic end view of a casing in accordance with one embodiment of the present disclosure.

In one non-limiting embodiment, the ceramic inner layer 74 is curved or configured to match the curvature of the inner surface 76 of the outer layer or outer ring layer 78 it is bonded to.

Figure 4:
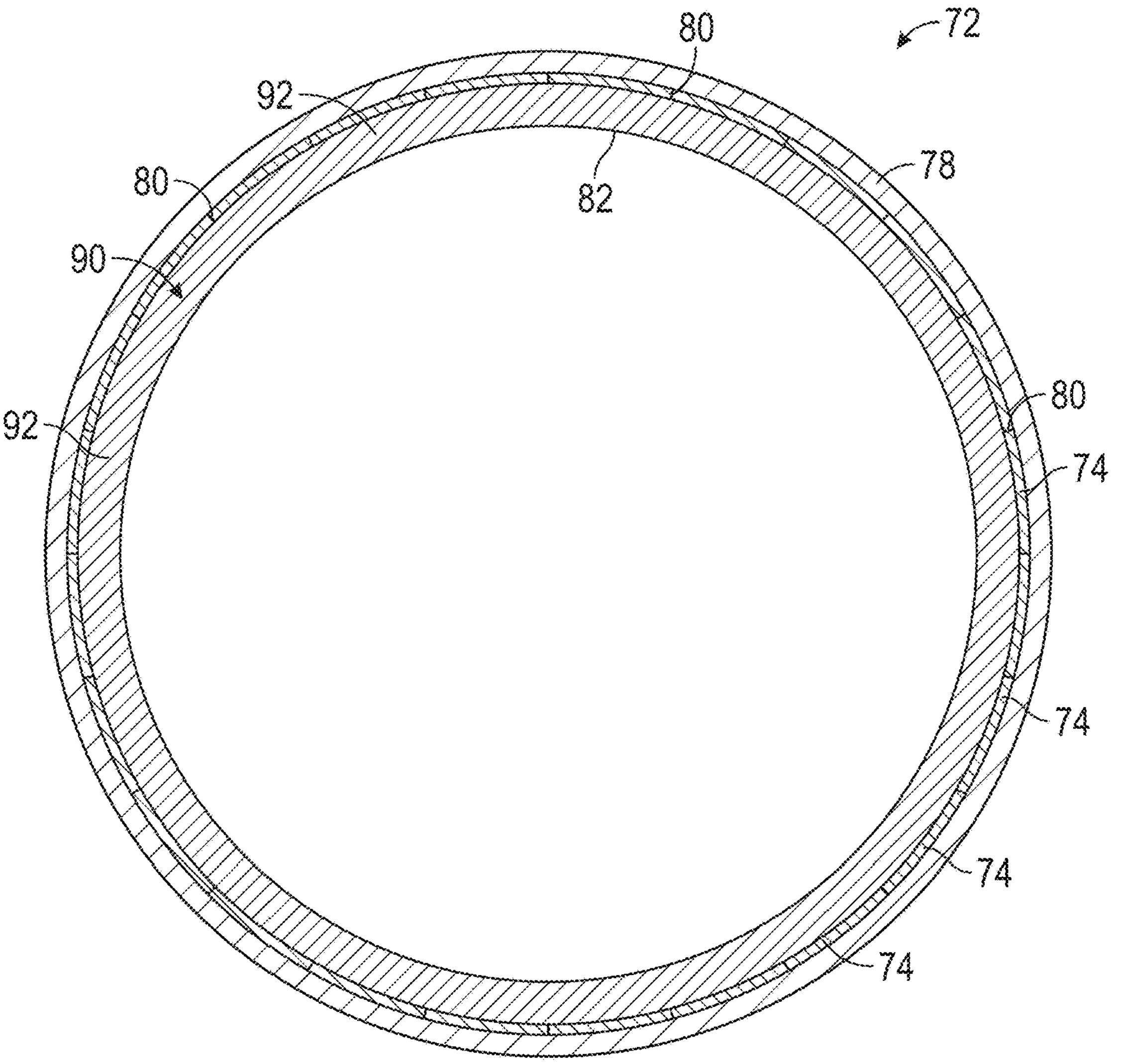
FIG. 4 is an end view of a fan case in accordance with an alternative embodiment of the present disclosure.

If on the other hand there is a significant difference in coefficients of thermal expansion between the inner ceramic layer 74 and the outer layer or outer ring layer 78, the ceramic inner layer 74 is a plurality of ceramic inner segments 74 that circumscribe the inner surface 76 of the outer layer or outer ring layer 78 and each of these segments 74 are bonded to the inner surface 76 of the outer layer or outer ring layer 78. Again, the ceramic inner segments 74 may curved or configured to match the curvature of the inner surface 76 of the outer layer or outer ring layer 78 they are bonded to. In this embodiment, each of the plurality of ceramic inner segments 74 may be referred to as each having a fore and aft end that abuts a fore and aft end of an adjacent one of the plurality of ceramic inner segments 74 such that a plurality of joints 80 are provided to allow for the mismatch in the coefficients of thermal expansion between the inner ceramic segments 74 and the outer layer or outer ring layer 78. See for example, FIG. 4, which is a schematic end view of a casing in accordance with one embodiment of the present disclosure. These joints may be referred to as expansion joints. In addition, the use of segments will also make the ceramic segments more cost effective.

In one non-limiting embodiment, the ceramic segments may be any shape that allows full coverage when arranged in a pattern. For example, the segments 74 may be shaped as rectangles, triangles, hexagons, etc.

Figure 5:
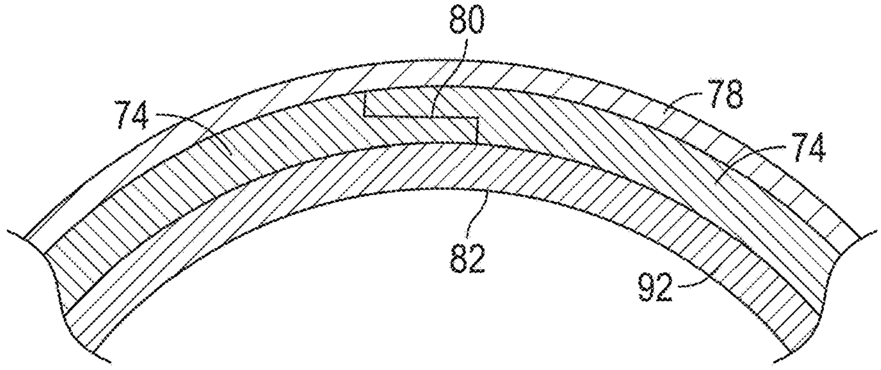
FIG. 5 is a portion of an end view of a fan case in accordance with an alternative embodiment of the present disclosure.

In yet another alternative embodiment, each of the plurality of ceramic inner segments 74 having a fore and aft end and the aft end of each ceramic segment 74 is configured to overlap a fore end of an adjacent one of the plurality of ceramic inner segments 74 such that a plurality of overlapping joints 80 are provided between each of the plurality of ceramic inner segments 74 and each of the plurality of ceramic inner segments 74 are still bonded to the outer layer or outer ring layer or outer ring portion 78. See for example, FIG. 5, which is a schematic end view of a casing in accordance with one embodiment of the present disclosure. These joints may also be referred to as expansion joints. In this embodiment, the fore and aft end of each of the plurality of ceramic inner segments 74 have a flange or tab portion 94 configured to mate with a corresponding flange or tab portion 94 of an adjacent one of the plurality of ceramic inner segments 74. Alternatively, the fore and aft end of each of the plurality of ceramic inner segments 74 have the same configuration and the aft end of each of the plurality of ceramic inner segments 74 overlaps a fore end of an adjacent one of the plurality of ceramic inner segments 74 and a thickness of the boding material securing the plurality of ceramic inner segments 74 to the outer layer or outer ring layer or outer ring portion 78 may vary accordingly to accommodate for this overlapping configuration. In addition, the use of segments will also make the ceramic layer more cost effective.

As illustrated in at least FIGS. 2-5, the casing 72 includes an inner layer or inner ring portion or gas path skin 82. In one embodiment, the inner layer or inner ring portion or gas path skin 82 provides a gaspath and structural features of the casing 72. In one non-limiting embodiment, the inner ring portion or gas path skin 82 may be formed from sheet metal or metal that is ductile. In another embodiment, the inner ring portion or gas path skin 82 may be formed a composite material. The inner ring portion or gas path skin 82 may be formed with a recessed area 84 for receipt of an abradable surface or layer 86 such as a composite potting material. The abradable surface 86 being aligned with rotating blades 22 of the fan 12. The recessed area 84 and the abradable surface or layer 86 are located on a radially inner surface 88 of the inner ring portion or gas path skin 82. Of course, embodiments of the present disclosure contemplate an inner ring portion or gas path skin 82 without the recessed area 84 and abradable surface or layer 86. The inner ring portion or gas path skin 82 may also be configured to have perforations for acoustic purposes.

A volume 90 is defined between the inner ceramic layer 74 and the inner ring portion or gas path skin 82. This volume 90 is filled with a light weight structural honeycomb or foam 92. The light weight structural honeycomb or foam 92 is bonded to both the inner ceramic layer 74 and the inner ring portion or gas path skin 82. In yet another alternative, the volume 90 is filled with a combination of light weight structural honeycomb and foam 92. In one non-limiting embodiment, the intermediate layer of honeycomb is NOMEX honeycomb or aluminum single or double flex honeycomb or corrugated aluminum. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof. In one non-limiting embodiment, the intermediate layer of foam is aluminum or polymer, closed or open cell foam.

When a blade is released, it will pass through the abradable surface 86 and/or inner ring portion or gas path skin 82 without losing significant energy, but the blade 22 will bend and may form a cutting tip. Once the blade 22 hits the ceramic layer 74, the whole case 72 will deform and the impacted ceramic layer 74 will fracture, but its fragments will be held together by the tensile ductility of the outer layer 78 and the released blade will be arrested without penetration of the case.

The ceramic layer 74 is intended to prevent the released blade from cutting through containment material 74 due to sharp edges formed as the blade is contained. Since a large portion of containment stresses at the inner portion of the hard wall case are compressive, replacing this metal with a lower density, higher compressive strength ceramic will also lead to a lower weight containment case.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:
- an inner ring portion that provides a gaspath and structural features of the casing;
- an outermost ring portion; and
- an inner ceramic layer arranged radially between the inner ring portion and the outermost ring portion, wherein the inner ceramic layer is completely enclosed by the inner ring portion and bonded directly to an inner surface of the outermost ring portion such that the combination of the outermost ring portion and the inner ceramic layer provide both containment and primary structural features of the casing.

2. The casing as in claim 1, wherein the inner ceramic layer is formed from ceramic comprising silicon carbide or boron carbide or a ceramic matrix composite.

3. The casing as in claim 1, wherein the outermost ring portion is a ductile metal structure.

4. The casing as in claim 1, wherein a layer of honeycomb is located between the inner ring portion and the inner ceramic layer.

5. The casing as in claim 1, wherein the inner ceramic layer is a single piece that circumferentially surrounds an inner surface of the outermost ring portion.

6. The casing as in claim 1, wherein the inner ceramic layer is curved to match a curvature of the inner surface of the outermost ring portion.

7. The casing as in claim 1, wherein the inner ceramic layer comprises a plurality of ceramic inner segments that circumscribe the inner surface of the outermost ring portion.

8. The casing as in claim 7, wherein each of the plurality of ceramic inner segments are curved to match a curvature of the inner surface of the outermost ring portion.

9. The casing as in claim 7, wherein each of the plurality of ceramic inner segments have a fore and aft end and the aft end of each of the plurality of ceramic inner segments abuts a fore end of an adjacent one of the plurality of ceramic inner segments such that a plurality of joints are provided between each of the plurality of ceramic inner segments.

10. The casing as in claim 7, wherein an expansion joint is located between each of the plurality of ceramic inner segments.

11. The casing as in claim 7, wherein each of the plurality of ceramic inner segments have a fore and aft end and the aft end of each of the plurality of ceramic inner segments overlaps a fore end of an adjacent one of the plurality of ceramic inner segments such that a plurality of overlapping joints are provided between each of the plurality of ceramic inner segments.

12. The casing as in claim 11, wherein the fore and aft end of each of the plurality of ceramic inner segments have a flange configured to mate with a corresponding flange of an adjacent one of the plurality of ceramic inner segments.

13. The casing as in claim 1, wherein the inner ring portion is formed from a ductile metal and the inner ring portion is formed with a recessed area and an abradable surface is located within the recessed area.

14. The casing as in claim 13, wherein a layer of honeycomb or foam is located between the inner ring portion and the inner ceramic layer and the layer of honeycomb or foam is bonded to both the inner ceramic layer and the inner ring portion.

15. The casing as in claim 1, wherein the casing is a fan casing.

16. A gas turbine engine, comprising:
- a fan having a plurality of fan blades;
- a casing surrounding the plurality of fan blades, the casing comprising:
  - an inner ring portion that provides a gaspath and structural features of the casing;
  - an outermost ring portion; and
  - an inner ceramic layer arranged radially between the inner ring portion and the outermost ring portion, wherein the inner ceramic layer is completely enclosed by the inner ring portion and bonded directly to an inner surface of the outermost ring portion such that the combination of the outermost ring portion and the inner ceramic layer provide both containment and primary structural features of the casing.

17. The gas turbine engine as in claim 16, wherein the inner ring portion is formed with a recessed area and an abradable surface is located within the recessed area and the abradable surface is aligned with plurality of fan blades.

18. The gas turbine engine as in claim 16, wherein the outermost ring portion is a ductile metal structure or composite material and a layer of honeycomb is located between the inner ring portion and the inner ceramic layer.

19. The gas turbine engine as in claim 16, wherein the inner ceramic layer is a single piece that circumferentially surrounds an inner surface of the outermost ring portion.

20. The gas turbine engine as in claim 16, wherein the inner ceramic layer comprises a plurality of ceramic inner segments that circumscribe the inner surface of the outermost ring portion.

* * * * *